(12) United States Patent
Solstin

(10) Patent No.: US 11,572,165 B2
(45) Date of Patent: Feb. 7, 2023

(54) TANDEM-TILTROTOR APPARATUS

(71) Applicant: Bryan B Solstin, Mill Creek, WA (US)

(72) Inventor: Bryan B Solstin, Mill Creek, WA (US)

( * ) Notice: Subject to any disclaimer, the term of this patent is extended or adjusted under 35 U.S.C. 154(b) by 388 days.

(21) Appl. No.: 16/795,384

(22) Filed: Feb. 19, 2020

(65) Prior Publication Data

US 2021/0253235 A1  Aug. 19, 2021

(51) Int. Cl.
*B64C 29/00* (2006.01)

(52) U.S. Cl.
CPC ................................. *B64C 29/0033* (2013.01)

(58) Field of Classification Search
CPC ................................................. B64C 29/0033
See application file for complete search history.

(56) References Cited

U.S. PATENT DOCUMENTS

| | | | | |
|---|---|---|---|---|
| 3,089,666 | A * | 5/1963 | Quenzler | B64C 29/0033 244/66 |
| 3,173,629 | A * | 3/1965 | Uhor | B64C 29/00 244/4 A |
| 3,273,827 | A * | 9/1966 | Girard | B64C 29/0033 D12/326 |
| 5,381,986 | A | 1/1995 | Smith | |
| 5,941,478 | A * | 8/1999 | Schmittle | B64C 1/00 244/131 |
| 9,643,720 | B2 * | 5/2017 | Hesselbarth | B64C 29/0075 |
| 2017/0233069 | A1 * | 8/2017 | Apkarian | B64F 5/10 244/7 R |
| 2021/0107639 | A1 * | 4/2021 | Hymer | B64C 27/22 |
| 2021/0284329 | A1 * | 9/2021 | Bernard | B64C 25/52 |

FOREIGN PATENT DOCUMENTS

WO   WO-2014025444 A2 *  2/2014  .............. B64C 27/00

* cited by examiner

*Primary Examiner* — Tien Q Dinh
*Assistant Examiner* — William L Gmoser

(57) ABSTRACT

A tandem-tiltrotor apparatus, comprising a right-wing, a pin extending substantially in an inboard-outboard direction of the aircraft, a leadingedge-leaf connected to the hollow-pin providing the leadingedge-leaf 1-degree of rotational freedom around the pin. A tandem-tiltrotor power apparatus, comprising a right-wing, a front-wingleaf, hollow-pin extending substantially in an inboard-outboard direction of the aircraft, a leadingedge-leaf connected to a pin providing the leadingedge-leaf having 1-degree of rotational freedom around the hollow-pin, and a power cable threaded through the hollow-pin. A tandem-tiltrotor link apparatus, comprising a right-wing, a hollow-pin extending substantially in a inboard-outboard direction of the aircraft, a leadingedge-leaf having 1-degree of rotational freedom around the hollow-pin, a frontlink, fixed to the leadingedge-leaf lower surface and a frontlink-hinge fixed to the frontlink.

10 Claims, 11 Drawing Sheets

TANDEM-TILTROTOR APPARATUS

BACKGROUND

The Tandem-Tiltrotor relates to tiltrotor aircraft; and more particularly, the Tandem-Tiltrotor having a link between a leadingedge hinge-leaf and a trailingedge hinge-leaf. The failure of the Iran hostage rescue mission in 1980 demonstrated a need for a new type of aircraft. The resulting V-22 Tiltrotor Osprey with a fixed wing Vertical Take-Off and Landing (VTOL) proved valuable. Tilt-rotor aircraft hover like a helicopter, but with a fixed wing, flew faster and further.

On the other hand, The V-22 Osprey tiltrotor engines remain at risk with sand and silt. Quad copters have shown fail safety with vertical capability when one rotor fails and the remaining three remain capable. In this disclosure, the tandem-tiltrotor represents additional layers of fail safety while providing faster and further range capability.

With four or more rotors, instead of the V-22 two rotors, noise can be reduced by reducing rotor tip-speed and reducing force per area. Noise is of a concern for air taxi acceptance. The tandem-tiltrotor apparatus may be an opportunity to simplify the VTOL, improve fail safety and reduce noise.

SUMMARY

A tandem-tiltrotor apparatus, comprising a wing, a pin extending substantially in an inboard-outboard direction of the aircraft, a leadingedge-leaf connected to the pin providing the leadingedge-leaf 1-degree of rotational freedom around the pin and a trailingedge-leaf A tandem-tiltrotor power apparatus, comprising a wing, a front-wingleaf connected to the wing, hollow-pin extending substantially in an inboard-outboard direction of the aircraft, a leadingedge-leaf connected to a hollow-pin providing the leadingedge-leaf to have 1-degree of rotational freedom around a hollow-pin, and a power cable threaded through the hollow-pin.

A tandem-tiltrotor link apparatus, comprising a wing, a pin extending substantially in a inboard-outboard direction of the aircraft, a leadingedge-leaf having 1-degree of rotational freedom around the pin, a frontlink, fixed to the leadingedge-leaf lower surface and a frontlink-hinge fixed to the frontlink.

BRIEF DESCRIPTION OF THE FIGURES

The apparatus may be better understood by referring to the following Figures. The components in the figures are not necessarily to scale, emphasis instead being placed upon illustrating the principles of the apparatus. In the figures, reference numerals designate corresponding parts throughout the different views.

DETAILED DESCRIPTION

Figure 1A:
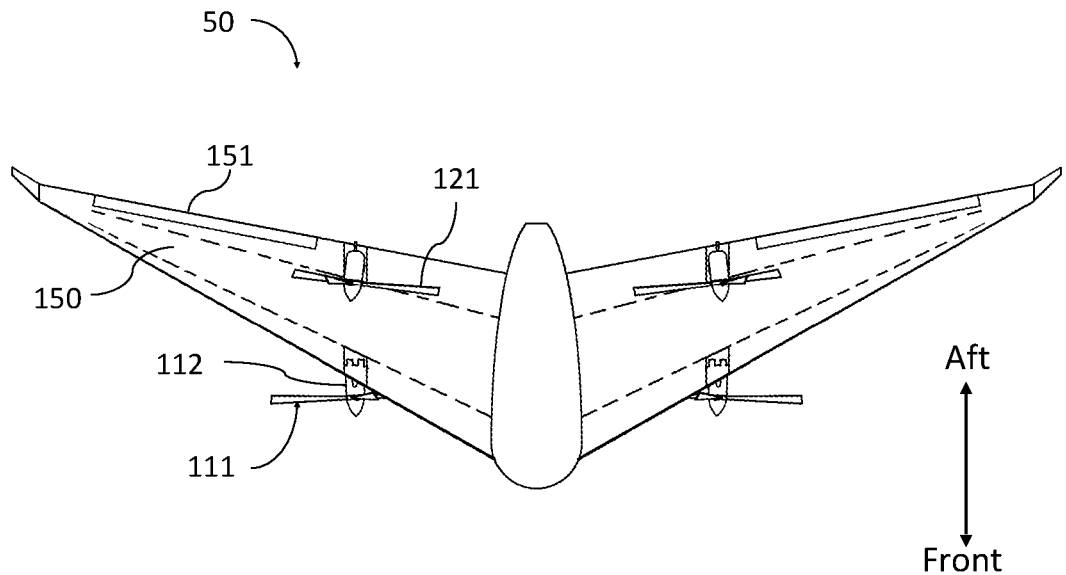
FIG. 1A represents a top view of the aircraft and two Tandem-Tiltrotors in the Cruise-Configuration.

Definitions:

As used herein, the term "Cruise-Configuration" (50) has reference to tandem rotors facing substantially forward. The cruise configuration (50) represents the most efficient configuration for long range.

As used herein, the term "Vertical-Configuration" (100) has reference to tandem rotors facing substantially up. The Vertical-Configuration (100) is for Vertical Take-Off and Land (VTOL).

Short Take-Off and Landing (STOL Configuration) is not explicitly shown, but depending on the aircraft, drone or piloted, is between a cruise configuration (50) and vertical-configuration (100). Pontoons for water implicitly enables a STOL Configuration. A nose wheel and Link wheels with a tricycle configuration common to commercial aircraft also imply a STOL Configuration improving payload capacity due to additional wing lift and ground effect.

As used herein, the term "Front-Rotor" (111) has reference to the combination of several rotary wings (rotor blades) that generates the aerodynamic lift force or thrust that counteracts aerodynamic drag in forward flight. During the Cruise Configuration, the Front-Rotor (111) is below the Right-Wing (150). During the Cruise Configuration, turbulence from the Front-Rotor that go up and over the Right-Wing will reduce the wing's lift.

As used herein, the term "Front-Motor" (112) has reference to a motor connected to the axial shaft of the Front-Rotor. In the best mode embodiment, the Front Motor provides for an electric motor.

As used herein, the term "Front-Pylon" (113) has reference to an external mount and is connected to the Front-Motor. The connection is fixed, no degrees of freedom between the Front-Motor nacelle and Front-Pylon. With the best mode of the invention, the pylon provides for a guide vane. Some may believe the pylon merely adds drag. With the Outlet Guide Vane (OGV) on a turbo engine, the OGV provides structure and provides efficient delivery of airflow to the combustor. Likewise, a pylon guide vane will direct airflow to a more efficient path.

As used herein, the term "LeadingEdge-Leaf" (114) has reference to the actuating part of the hinge that rotates about the Front-Hinge. LeadingEdge-Leaf complies with the surface contour of the wing's leading edge, when the LeadingEdge-Leaf is positioned in the Cruise Configuration. On the distal end from the Front Pylon's motor mount, the Pylon connects to the lower surface of the LeadingEdge-Leaf.

As used herein, the term "Front-Hinge" (115) represents a plurality of hinges and the pin center with a dashed line, with one rotational degree for freedom, between the LeadingEdge-Leaf and the Front-Wingleaf. The Front-Hinge is substantially in the outboard-inboard direction plus or minus 5 degrees.

As used herein, the term "Front-Wingleaf" (116) provides for positioning a hinge in relation to the right-wing. The Front-Wingleaf is fixed to the right-wing structure. The Front-Wingleaf provides for efficient multiuse structure for wing loads, landing loads, VTOL propulsion loads, STOL propulsion loads and cruise propulsion loads. The LeadingEdge-Leaf (114) hinges on the Front-Wingleaf.

As used herein, the term "FrontLink" (117) has reference to a fixed connection to the LeadingEdge-Leaf (114) and points downward when the LeadingEdge-Leaf is in the Vertical Configuration. In the Cruise Configuration, the FrontLink rotates to a vertical, more aerodynamic alignment. The FrontLink connects to the FrontLink-Hinge (131).

As used herein, the term "Aft-Rotor" (121) has reference to a combination of several rotary wings (rotor blades) that generates the aerodynamic lift force or thrust that counteracts aerodynamic drag in forward flight. During the Cruise Configuration, the Aft-Rotor (121) is above the Right-Wing (150).

As used herein, the term "Aft-Motor" (122) provides for a connection to the axial shaft of the Aft-Rotor. In this embodiment, the Front-Motor provides for an electric motor.

As used herein, the term "Aft-Pylon" (123) provides for an external mount and providing a connecting to the Aft-Motor casing. The connection provides for a fixed, no degrees of freedom between the Aft-Pylon and Aft-Motor.

As used herein, the term "TrailingEdge-Leaf" (124) provides for actuating part hinged about the TrailingEdge-Hinge (125). TrailingEdge-Leaf complies with the surface contour of the wing's trailing edge, when the TrailingEdge-Leaf is positioned in the Cruise Configuration. On the distal end from the Aft-Pylon's motor mount, the Aft-Pylon connects to the TrailingEdge-Leaf. With the best mode of the invention, the pylon provides for a guide vane. Some believe the pylon merely adds drag. With the Outlet Guide Vane (OGV) on a turbo engine, the OGV provides structure and provides efficient delivery of airflow to the combustor. Likewise, a pylon guide vane directs airflow to a more efficient path.

As used herein, the term "TrailingEdge-Hinge" (125) represents a plurality of hinges and the center with a dashed line, with one rotational degree for freedom, between the TrailingEdge-Leaf and TrailingEdge-Wingleaf (126). The TrailingEdge-Hinge is substantially in the outboard-inboard direction plus or minus 5 degrees.

As used herein, the term "TrailingEdge-Wingleaf" (126) provides for positioning a hinge in relation to the right-wing. The TrailingEdge-Wingleaf is part of the Right-Wing structure. The TrailingEdge-Wingleaf provides for efficient multiuse structure for wing loads, landing loads, VTOL propulsion loads, STOL propulsion loads and cruise propulsion loads. The TrailingEdge-Leaf (124) hinges on the TrailingEdge-Wingleaf.

As used herein, the term "TE-Spur" (127) integrates and represents a fixed connection to the TrailingEdge-Leaf (124) and points substantially down when the TrailingEdge-Leaf in the Vertical Configuration. In FIG. 4B, the TE-Spur is mostly integrated into the TrailingEdge-Leaf (124). In some embodiments, the TE-Spur could be, fully integrated into the TrailingEdge-Leaf. On the distal end of the TE-Spur from the TrailingEdge-Leaf connection, the TE-Spur connects to the AftLink-Hinge (132).

As used herein, the term "Link" (130) represent a substantially tension structure throughout the flight envelope; except when it used as landing gear. Bending and other abuse loads are factored. With an ice landing zone, the link is textured on the landing surface. Links can be rapidly swapped at the FrontLink-Hinge (131) and AftLink-Hinge (132). See Pontoon-Link (133) for a Tandem-Tiltrotor seaplane.

As used herein, the term "FrontLink-Hinge" (131) provides for a rapid connection to the Front-Spar (117) and the Link (130).

As used herein, the term "AftLink-Hinge" (132) provides for a rapid connection to the TE-Spur (127) and the link (130), Pontoon-Link (133P or other connections.

As used herein, the term "Pontoon-Link" (133) provides for rapid install at the FrontLink-Hinge (131) and the AftLink-Hinge (132) enabling a Tandem-Tiltrotor seaplane variant.

As used herein, the term "Right-Wing" (150) is represented in each Figure and represents a static structure comprised of at least one spar, ribs and upper and lower skin. The elements discussed on the wing, including a Tandem-Tiltrotor, can mirror or reposition onto the left wing.

As used herein, the term "Aileron" (151) represents a movable surface in the Trailing Edge of the right wing and left wing.

As used herein, the term "Front Spar" (153) represents a spar as a principal structural member of the right wing, running spanwise at right angles (or thereabouts depending on wing sweep) to the fuselage. Some fixed-wing aircraft will have singular spar. The dotted line in FIG. 1A and FIG. 1B indicate Front Spar and Aft Spar hidden residing below the upper wing's skin.

As used herein, the term "Aft Spar" (154) represents a spar is a principal structural member of the right-wing, running spanwise at right angles (or thereabouts depending on wing sweep) to the fuselage and is behind of the Front Spar. Some fixed-wing aircraft have a singular spar. The dotted line in FIG. 1A and FIG. 1B indicate Front Spar and Aft Spar are hidden residing below the upper wing's skin.

As used herein, the term "Rib" (155) in regards to a wing rib instead of a leaf rib, represents a structure orthogonal to the spars and repeated at substantially equidistant intervals. In the FIG. 5 embodiment, the right-wing has two spars. In FIG. 5, the ribs are positioned mostly orthogonal between the Front Spar and Aft Spar and positioned to provide additional structure to the Tandem-Tiltrotor.

As used herein, the term "Winglet" (156) relates to a structure at the wingtip set at an angle to the plane of the right-wing designed to reduce drag by its effect on wingtip vortices.

As used herein, the term "Control Unit" (160) represents a Control Unit for a Tandem-Tiltrotor. The Control Unit is connected to a Tilt-Actuator (170) and Locking-Pin-Mechanisms (162) (163) (164) and synchronizes the Tilt-Motors (173).

As used herein, the term "Spring-Locking-Pin-Mechanism" (162) (163) (164) provides for a connection and controlled by a Control Unit (160). A spring automatically push the pin into a respective pin-hole. The energized solenoid pulls the pin out of the pin-hole As used herein, the term "Pin-Hole Plate" (165) receives the locking-pin form the Spring-Locking-Pin-Mechanism.

As used herein, the term "Electric-Screw-Actuator" (166), in the best mode, unscrews a holding pin from the Slotted-Joint (167).

As used herein, the term "Slotted-Joint" (167) represents a joint with the curvature of the radii from the Front-Hinge (115)

As used herein, the term "Tilt-Actuator" (170) receives a control signal and responds by converting the signal into tilt-motor energy, rotating the tilt-actuator with mechanical motion of the LeadingEdge-Leaf (114) and the actuating parts on the Tandem-Tiltrotor. Since the Front-Rotor and Aft-Rotor pull the link against each other, the Link (130) is in tension and when balanced (neutral), does not move. A surprisingly small Tilt-Actuator tips the balance to transition from the Cruise Configuration to the Vertical-Configuration or vice versa.

As used herein, the term "Tilt-Rotary-Sensor" (171) represents a rotating sensor with armature and second armature. The first armature connects to a second larger armature. The rotatable, double armature provides for a connection to an actuating leaf. The resulting signal is calibrated and provides for the angle of the proximal hinge.

As used herein, the term "Gear Reducer" (172) means RPM speed from the electric motor is reduced to the Tilt-Actuator RPM (170).

As used herein, the term "Right Tilt-Motor" (173) mounted in the right wing provides for an electric motor connected to the gear reducer.

As used herein, the term "Torque Rod" (174) provides for a physical synchronization between two "Tilt Motors". A single torque rod would be simple drone. In typical practice, a plurality of torque rods connected by bevel gears enables a connection of two Tilt Motors.

As used herein, the term "Left Tilt-Motor" (175) provides for an electric motor and is connected to a gear reducer.

Figure 3A:
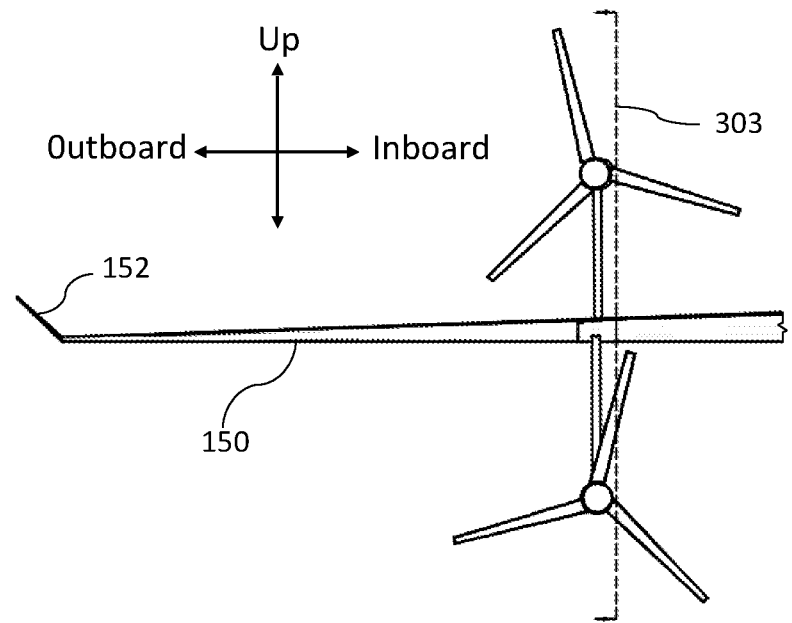
FIG. 3A represents a front view of the right-wing, winglet and the Tandem-Tiltrotor in the Cruise-Configuration.
Figure 3B:
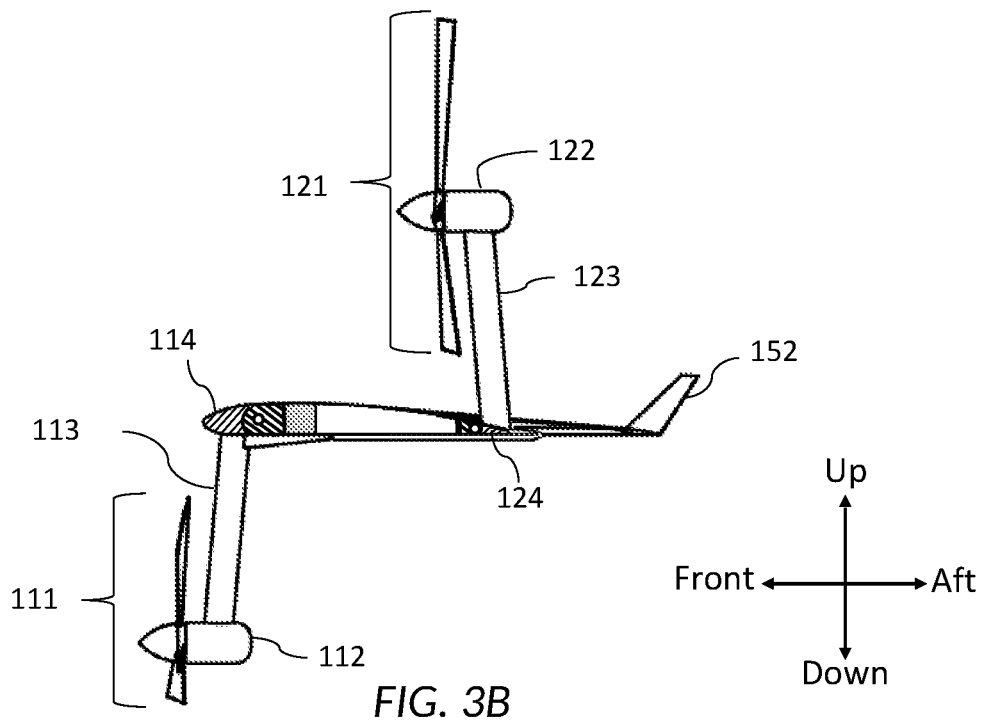
FIG. 3B represents a section cut of the right wing with the perspective from the aircraft centerline to the outboard.

FIG. 3B section-cut (303) position is shown in FIG. 3A with dashed line and two arrows.

Figure 4A:
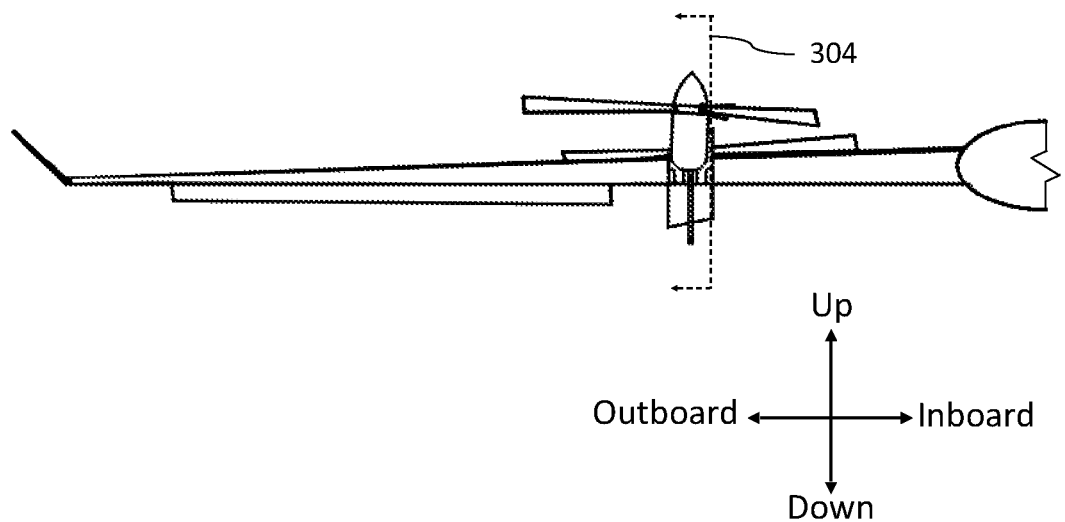
FIG. 4A represent a front view of the right wing and the dashed line and arrows represent the section cut and perspective for FIG. 4B.
Figure 4B:
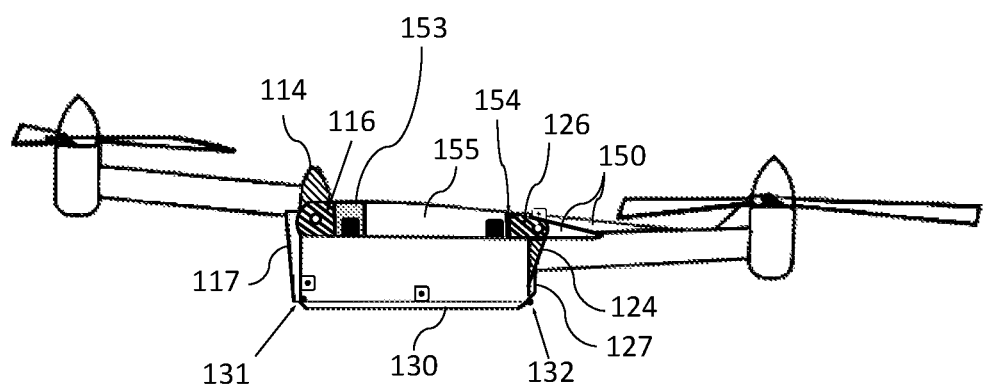
FIG. 4B represent a side view and section cut of the right wing with the perspective from the aircraft center line to the outboard.

FIG. 4B section-cut (304) position is shown in FIG. 4A with dashed line and two arrows.

Figure 5A:
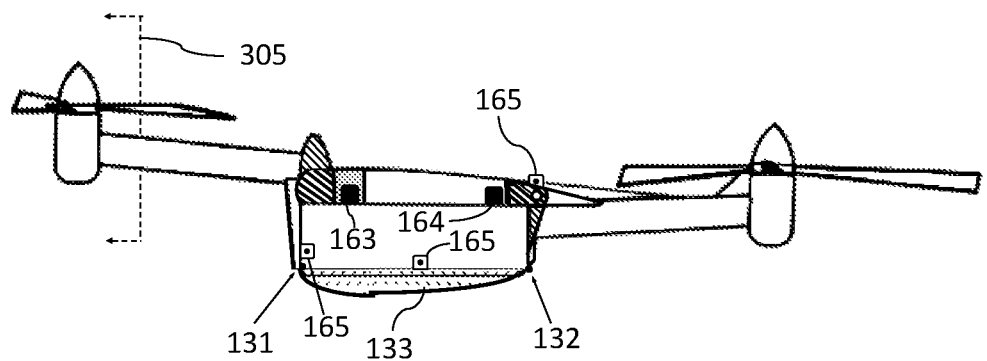
FIG. 5A shares the same section cut and perspective as FIG. 4B, but the Pontoon-Link is represented instead of the Link.
Figure 5B:
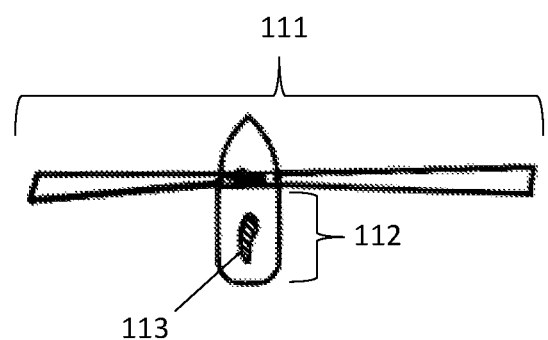
FIG. 5B, represents the Front-Pylon sectioned for viewing a cross-section of the guide vane.

FIG. 5B section-cut (305) position is shown in FIG. 5A with dashed line and two arrows.

As used herein, the term "LE-Rib-Hinge" (400) extends substantially in the inboard-outboard direction of the aircraft and provides for a rotatable connection between a Rotator-Rib (403) and a Static-Rib (402) in proximity to the wing's Leading Edge.

As used herein, the term "TE-Rib-Hinge" (401) extends substantially in the inboard-outboard direction of the aircraft and provides for rotatable connecting between a Rotator-Rib (403) and a Static-Rib (402) in proximity to the wing's Trailing Edge.

As used herein, the term "Rotator-Rib" (403) represents a rib in a LeadingEdge-Leaf (114) and a rib in a TrailingEdge-Leaf (124).

Static-Rib (402) represent ribs in a Front-Wingleaf (116) or a TrailingEdge-Wingleaf (126).

As used herein, the term "LE-Hollow-Pin" (404) provides for a Rotator-Rib (403) and Static Rib (402) to hinge. A plurality of Hollow-Pins align on the same hinge line extending substantially in the inboard-outboard direction of the aircraft and in proximity to the wing's Leading Edge.

As used herein, the term "TE-Hollow-Pin" (405) provides for a Rotator-Rib (403) and Static Rib (402) to hinge. A plurality of Hollow-Pins align on the same hinge line extending substantially in an inboard-outboard direction of the aircraft and in proximity to the wing's Trailing Edge.

As used herein, the term "Lock-Nut" (406) holds a TE-Rib-Hinge together and a LE-Rib-Hinge together. Safety wire provides an additional layer of protection of keeping the Lock-Nut firmly secure.

As used herein, the term "Wire Harness" (410) represents an assembly of electrical wires which transmit signals or electrical power.

As used herein, the term "Power Cable" (411) represents an electrical cable, providing for an assembly of one or more electrical conductors, held together with an overall sheath. The assembly is used for transmission of electrical power.

As used herein, the term "Bushing" (420) represents an insert into a hole in the Rotator-Rib or represents an insert into a hole in the Static-Rib.

As used herein, the term "Wear Bushing" (421) represents an insert outside of the Hollow-Pin, and in this best mode, and provides for polytetrafluoroethylene PTFE as the Wear Bushing material.

As used herein, the term "Washer" (430) provides for a thin plate, disk-shaped, with a hole.

As used herein, the term "Wear Washer" (431) represents a thin plate, disk-shaped, with a hole and provides for polytetrafluoroethylene PTFE as the Wear Washer material.

Six Degrees of Freedom represents the movements a rigid body moves in three-dimensional space. It defines the number of independent parameters that define the configuration of a mechanical system. For example, the rigid body can move in three dimensions using the X, Y and Z axes. The rigid body can also move in the remaining three are rotational degrees of freedom. They combine into the six degrees of freedom. Extending in an inboard-outboard direction provides for an equivalent three-dimensional line providing for an X axis.

Figures

Turning to FIG. 1A, the Cruise-Configuration (50) refers to the tandem-tiltrotors when they face substantially forward. The Cruise Configuration (50) is the most efficient configuration for long range. FIG. 1A represents a top view of the aircraft and two Tandem-Tiltrotors in the Cruise-Configuration. The Right-Wing (150) is visible and represents a static structure. The Aileron (151) is horizontal in the Cruise-Configuration and points downward in FIG. 1B.

Figure 1B:
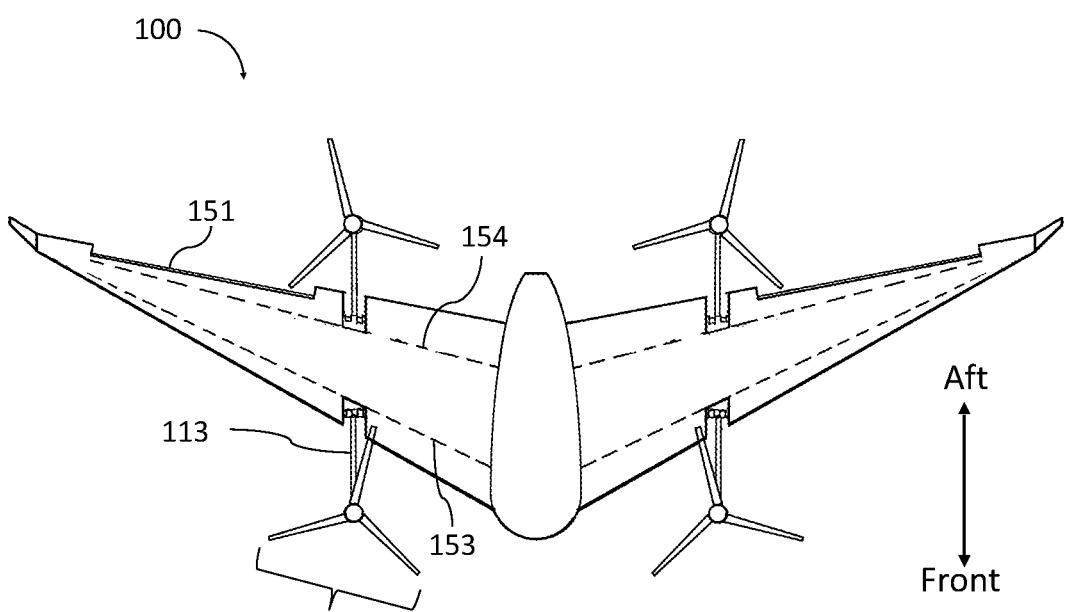
FIG. 1B represents a top view of the aircraft and two Tandem-Tiltrotors in the Vertical-Configuration.

FIG. 1B represents a top view of the aircraft and two Tandem-Tiltrotors in the Vertical-Configuration.

In FIG. 1A and FIG. 1B the Front Spar and Aft Spar are represented as hidden, dashed lines. On small drones, one spar may provide enough wing structure. The Tandem-Tiltrotor will structurally interact with the wing structure. A hinge near a spar provides structural advantage, even if the spar is an addition to the primary spar.

Figure 2A:
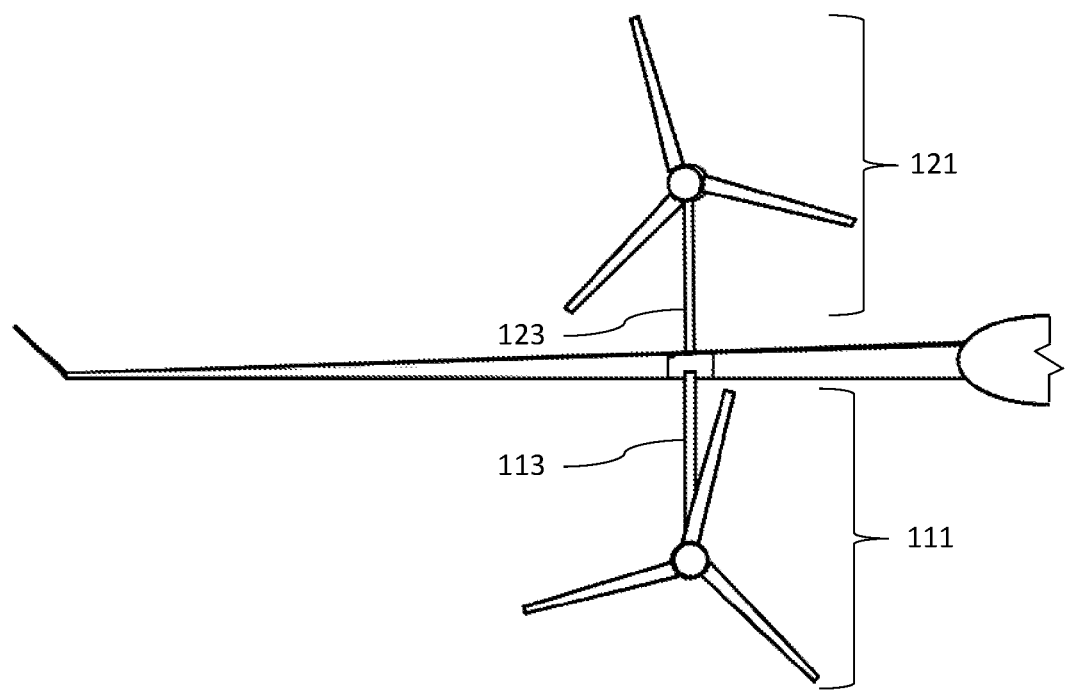
FIG. 2A represents a front view of the right wing and a Tandem-Tiltrotor in the Cruise-Configuration.

FIG. 2A represents a front view of the right wing and a Tandem-Tiltrotor in the Cruise-Configuration.

Figure 2B:
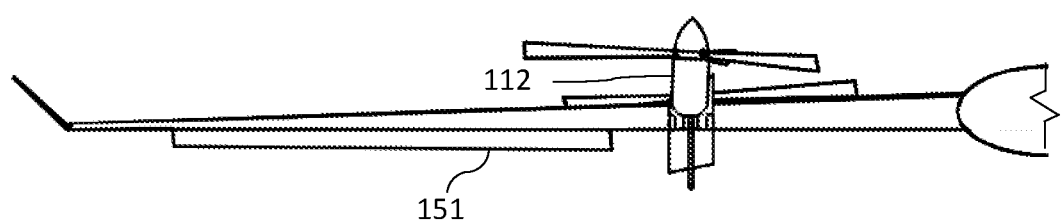
FIG. 2B represents a front view of the right wing and a Tandem-Tiltrotor in the Vertical-Configuration.

FIG. 2B represents a front view of the right wing and a Tandem-Tiltrotor in the Vertical-Configuration.

FIG. 3A represents a front view of the right (150), Winglet (152) and the Tandem-Tiltrotor in the Cruise-Configuration. The dashed and line and arrows (303) indicate a section cut and perspective used in the next Figure, FIG. 3B. The aerospace outboard-inboard convention is important for understanding inboard-outboard axis used in this specification. By looking at the topview inboard-outboard direction in FIG. 6A, and FIG. 3A frontview inboard-outboard direction the direction represents fully defined axis. The hinges on Tandem-Tiltrotor will substantially align with the inboard-outboard direction plus or minus five degrees. It's possible to exceed five degrees. For example, if the Tandem-Tiltrotor is positioned orthogonal to a swept wing and the rotors (111) (121), motors and pylons are rotated to face the airflow during cruise speed, but the Tandem-Tiltrotor links below the wing will no longer be substantially aligned with the airflow.

Looking at FIG. 3B, FIG. 3B represents a section cut of the right wing with the perspective from the aircraft centerline to the outboard. In the background, the Winglet (155) is visible.

Starting with a Front-Rotor (111), the rotor provides for the combination of several rotary wings (rotor blades) that generates the aerodynamic force. The Front-Rotor connected to the Front-Motor (112) with the axial shaft of the Front-Rotor. In this embodiment, the Front Motor provides for an electric motor. The Front-Motor connects to a Front-Pylon (113). The connection is fixed, no degrees of freedom between the Front-Motor and Front-Pylon. In the best mode of the invention, the pylon provides for a guide vane. Some may believe the pylon merely adds drag. With the Outlet Guide Vane (OGV) on a turbo engine, the OGV provides structure and provides efficient delivery of airflow to the combustor. Likewise, a pylon guide vane will direct airflow to a more efficient path.

At the distal end of the Front-Pylon connection to the Front-Motor, the Front-Pylon connects to the LeadingEdge-Leaf (114). LeadingEdge-Leaf complies with the surface contour of the wing's leading edge, when the LeadingEdge-Leaf is positioned in the Cruise Configuration. The Front-Pylon, LeadingEdge-Leaf and Front-Motor casing can be fastened efficiently, meaning less weight, by curing all three as one unit.

Continuing with FIG. 3B, the Aft-Rotor (121) provides for the combination of several rotary wings (rotor blades) that generates the aerodynamic force. The Aft-Rotor connected to the Aft-Motor (122) with the axial shaft of the Aft-Rotor. In this embodiment, the Aft-Motor provides for an electric motor. The Aft-Motor connects to an Aft-Pylon (123). The connection is fixed, no degrees of freedom between the Aft-Motor casing and Aft-Pylon. In the best mode of the invention, the pylon provides for a guide vane. Some may believe the pylon merely adds drag. With the Outlet Guide Vane (OGV) on a turbo engine, the OGV provides structure and provides efficient delivery of airflow to the combustor. Likewise, a pylon guide vane will direct airflow to a more efficient path.

At the distal end of the Aft-Pylon connection from the Aft-Motor, the Aft-Pylon connects to the TrailingEdge-Leaf (124). TrailingEdge-Leaf complies with the surface contour of the wing's trailing edge, when the TrailingEdge-Leaf is positioned in the Cruise Configuration.

FIG. 4A represent a front view of the right wing and the dashed line and arrows (304) represent the section cut and perspective for FIG. 4B.

FIG. 4B represent a side view and section cut of the right wing with the perspective from the aircraft center line to the outboard.

FrontLink (117) is fixed to the LeadingEdge-Leaf (114) and points downward as landing gear when the Leading-Edge-Leaf is in the Vertical Configuration. In the Cruise Configuration, the FrontLink rotates to a vertical, more aerodynamic alignment. The FrontLink connects to the Link (130) with the FrontLink-Hinge (131).

Link (130) represent a substantially tension structure throughout the flight envelope; except when it used as landing gear. Bending and other abuse loads are factored. With an ice landing zone, the link is textured on the landing surface. Links can be rapidly swapped at the FrontLink-Hinge (131) and AftLink-Hinge (132). Pontoon-Link (133) provides for rapid install at the FrontLink-Hinge (131) and the AftLink-Hinge (132) enabling a Tandem-Tiltrotor seaplane variant.

AftLink-Hinge (132) provide for a rapid connection between the TE-Spur (127) and the Link (130).

The TE-Spur is fixed with the TrailingEdge-Leaf (124) structure. The TrailingEdge-Leaf complies with the surface contour of the wing's trailing edge, when the TrailingEdge-Leaf is positioned in the Cruise Configuration.

TrailingEdge-Wingleaf (126) provides for positioning TrailingEdge-Hinge (125) relation to the right-wing. The TrailingEdge-Wingleaf is part of the Right-Wing structure. The TrailingEdge-Wingleaf provides for efficient multiuse structure for wing loads, landing loads, VTOL propulsion loads, STOL propulsion loads and cruise propulsion loads. The TrailingEdge-Leaf (124) hinges with the TrailingEdge-Wingleaf, and the TrailingEdge-Wingleaf is fixed to the right wing.

On the front side of the wing, a Front-Wingleaf (116) provides for positioning a hinge in relation to the right-wing. The Front-Wingleaf is fixed to the right-wing structure.

FIG. 3B provides a Cruise-Configuration view of the Tandem-Tiltrotor link apparatus and FIG. 4B provides a Vertical-Configuration view tandem-Tiltrotor link apparatus. Transition between the two provides for an STOL-Configuration. Pontoon-Links could enable a STOL-Configuration. A wheel in the nose and one wheel on each Link (130) could do the same.

Turning to FIG. 5A, which shares the same section cut and perspective as FIG. 4B, but the Pontoon-Link (133) is shown instead of the Link (130). In the Vertical-Configuration sever locks are exposed.

Spring-Locking-Pin-Mechanism (162) (163) (164) provides for a spring to push the pin into a respective pin-hole. The energized solenoid pulls the pin out of the pin-hole. When rotated into Cruise Configuration, Pin-Hole Plate (165) receives the locking-pin form the Spring-Locking-Pin-Mechanism and likewise for the Vertical-Configuration, when the plate is integrated into TrailingEdge-Leaf (124) and LeadingEdge-Leaf (114)

The dashed line and arrows (305) represent the section cut and perspective for FIG. 5B. In Fig. represents the Front-Pylon (113) sectioned for viewing the guide vane profile shape. Some believe the pylon merely adds drag. With the Outlet Guide Vane (OGV) on a turbo engine, the OGV provides structure and provides efficient delivery of airflow to the combustor. Likewise, the Front-Pylon with the profile shape of a guide vane will direct airflow to a more efficient path.

Figure 6A:
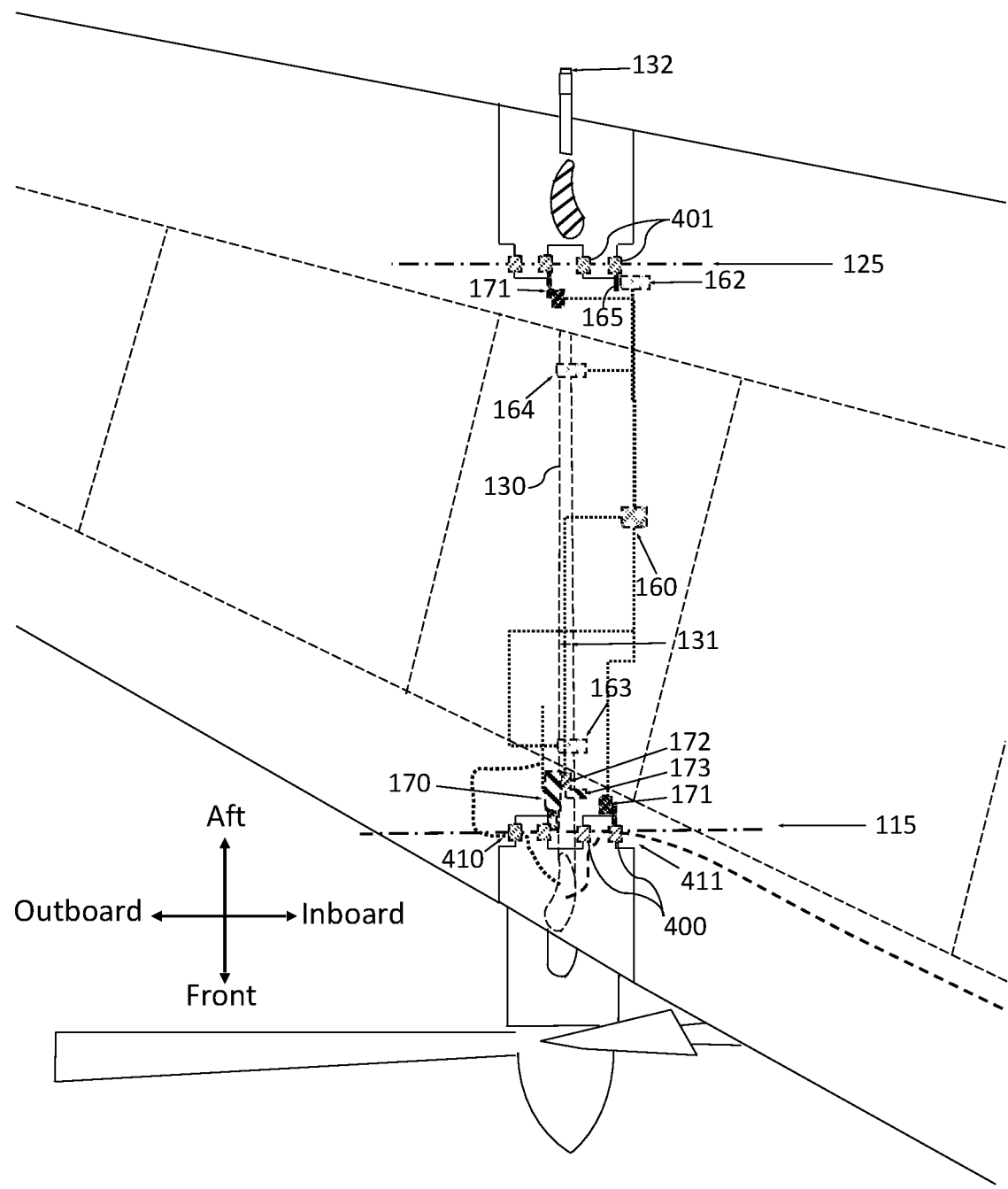
FIG. 6A represents a top-view schematic in context of the right wing.

Turning to FIG. 6A. FIG. 6A represents a top view of the right wing. The Aft-Pylon element above the right wing is sectioned. Within and below the wing, the hidden elements are dashed, dotted or patterned. The intent is to present a top-view schematic in context of the right wing. The Tandem-Tiltrotor is represented in the Cruise-Configuration.

Again in FIG. 6A: In regards to master geometry, the Front-Hinge (115) and TrailingEdge-Hinge (125) shown in FIG. 6A, interplay with the Computational Fluid Dynamics (CFD) of the wing, the Tandem-Tiltrotor Link and the ground. For the most part, the combination of elements can be analyzed as a wing, section-cut sketch. This is a necessary step for designing the Link when size requirements change.

Again in FIG. 6A: Spring-Locking-Pin-Mechanism (162) provides for a signal connection to a Control Unit (160) and provides for a spring to automatically push the pin into a respective pin-hole. An energized solenoid pulls the pin out of the pin-hole Again in FIG. 6A: A Tilt-Rotary-Sensor (171) provides for a small, rotating armature and second armature. Calibration provides the angle of the proximal hinge.

Again in FIG. 6A: a Control Unit (160) provides for input and output of the connected avionic elements. One of the connected elements, the tilt motor receives a control signal and responds by converting the signal into tilt-motor energy, rotating the tilt-actuator with mechanical motion rotating the LeadingEdge-Leaf (114) and the actuating parts on the Tandem-Tiltrotor Link. Since the Front-Rotor and Aft-Rotor pull against each other, the Link (130) is substantially balanced (neutral). A surprisingly small Tilt-Actuator tips the rotor balance to transition from the Cruise Configuration to the Vertical-Configuration or vice versa, or the STOL in between. In the best mode embodiment, the Tilt-Motor provides for an electric motor.

The Tilt-Actuator (170) provides for a screw actuator and provides for a primary lock for the Cruise Configuration and Vertical Configuration. A reversible Tilt-Motor powers the Tilt-Actuator. Spring-Locking-Pin-Mechanism (162) (163) (164) provide a secondary lock.

Again in FIG. 6A: Wire Harness (410) represents an assembly of electrical wires which transmit signals or electrical power and in FIG. 6. is represented by a dotted line passing from the right-wing to the articulating LeadingEdge-Leaf (114). The Power Cable (411) is an electrical cable, an assembly of one or more electrical conductors, usually held together with an overall sheath. The assembly is used for transmission of electrical power and is represented in FIG. 6A as a dashed line passing from the right-wing to the articulating LeadingEdge-Leaf (114) through the LE-Hollow-Pin (404). LE-Rib-Hinge (400) and TE-Rib-Hinge (401) will be discussed in the following Figures.

Figure 6B:
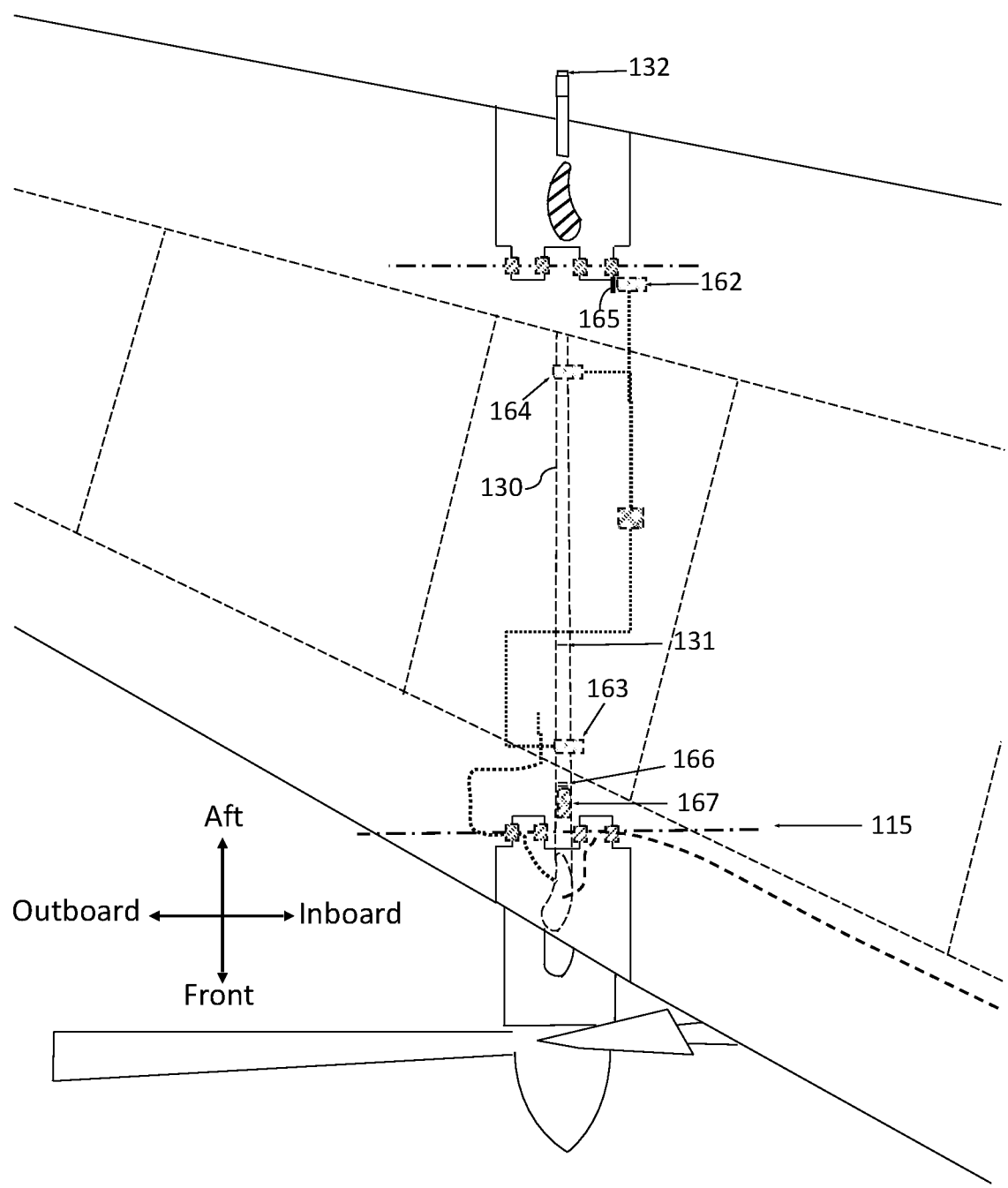
FIG. 6B represents a top-view schematic in context of the right wing.

Turning to FIG. 6B. FIG. 6B also represents a top-view schematic in context of the right wing. When locked in the Cruise-Configuration, there is a risk for the Tandem-Tiltrotor to remain locked before landing. In this scenario, a Slotted-Joint (167) with the curvature of the radii from the Front-Hinge (115) can be embedded into the FrontLink (117). An Electric-Screw-Actuator (166) unscrews a holding pin from the Slotted-Joint (167) severing the FrontLink in two, allowing rotation and breaking free from the secondary locks and allowing a near-vertical, belly landing, that should protect passengers from injury. Only three rotors in the vertical configuration should allow horizontal flight.

Figure 7:
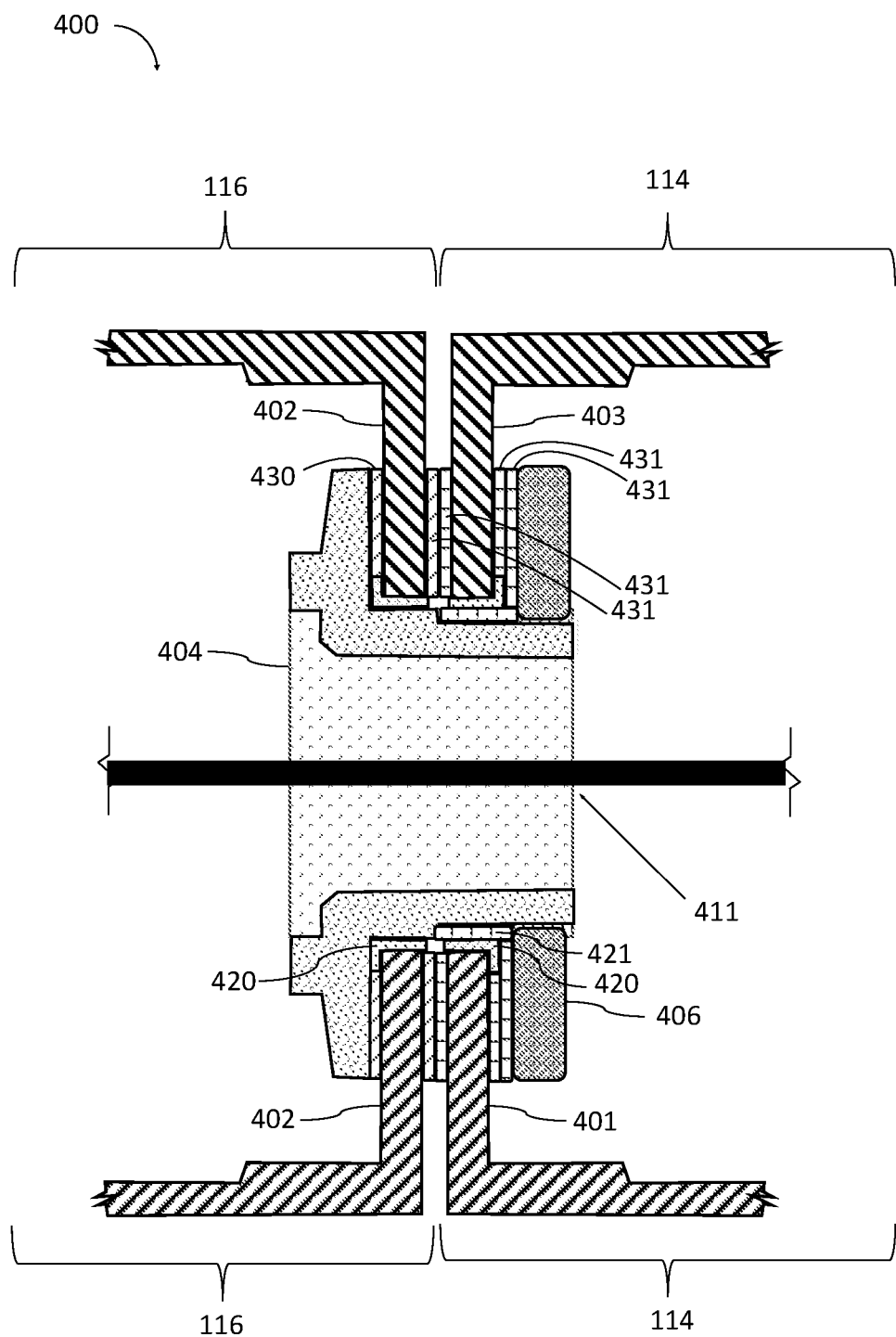
FIG. 7 represents a section view of a LE-Rib-Hinge, LE-Hollow-Pin (404), Rotator-Rib and Static Rib.

Turning to FIG. 7. FIG. 7 represents section view of the LE-Rib-Hinge (400) extending substantially in an inboard-outboard direction of the aircraft provides for connecting a Rotator-Rib (403) to a Static-Rib (402).

LE-Rib-Hinge (400) extending substantially in an inboard-outboard direction of the aircraft provides for connecting a Rotator-Rib (403) that rotates on a Static-Rib (402) in proximity to the wing's Leading Edge. Rotator-Rib (403) represents ribs in a LeadingEdge-Leaf (114). Static-Rib (402) represent ribs in a Front-Wingleaf (116). The LE-Hollow-Pin (404) provides for a Rotator-Rib (403) and Static Rib (402) to hinge. A plurality LE-Hollow-Pins (404) align on the same hinge line extending substantially in an inboard-outboard direction of the aircraft and in proximity to the wing's Leading Edge.

Lock-Nut (406) holds a rib-hinge together without loosening. Safety wire provides an additional layer of protection of keeping Lock-Nut secure.

In FIG. 7, the Power Cable (411) is an electrical cable, an assembly of one or more electrical conductors, usually held together with an overall sheath. The assembly is used for transmission of electrical power. The Power Cable represents a conduit from the right-wing to the articulating LeadingEdge-Leaf (114) through LE-Hollow-Pin (404).

Figure 8:
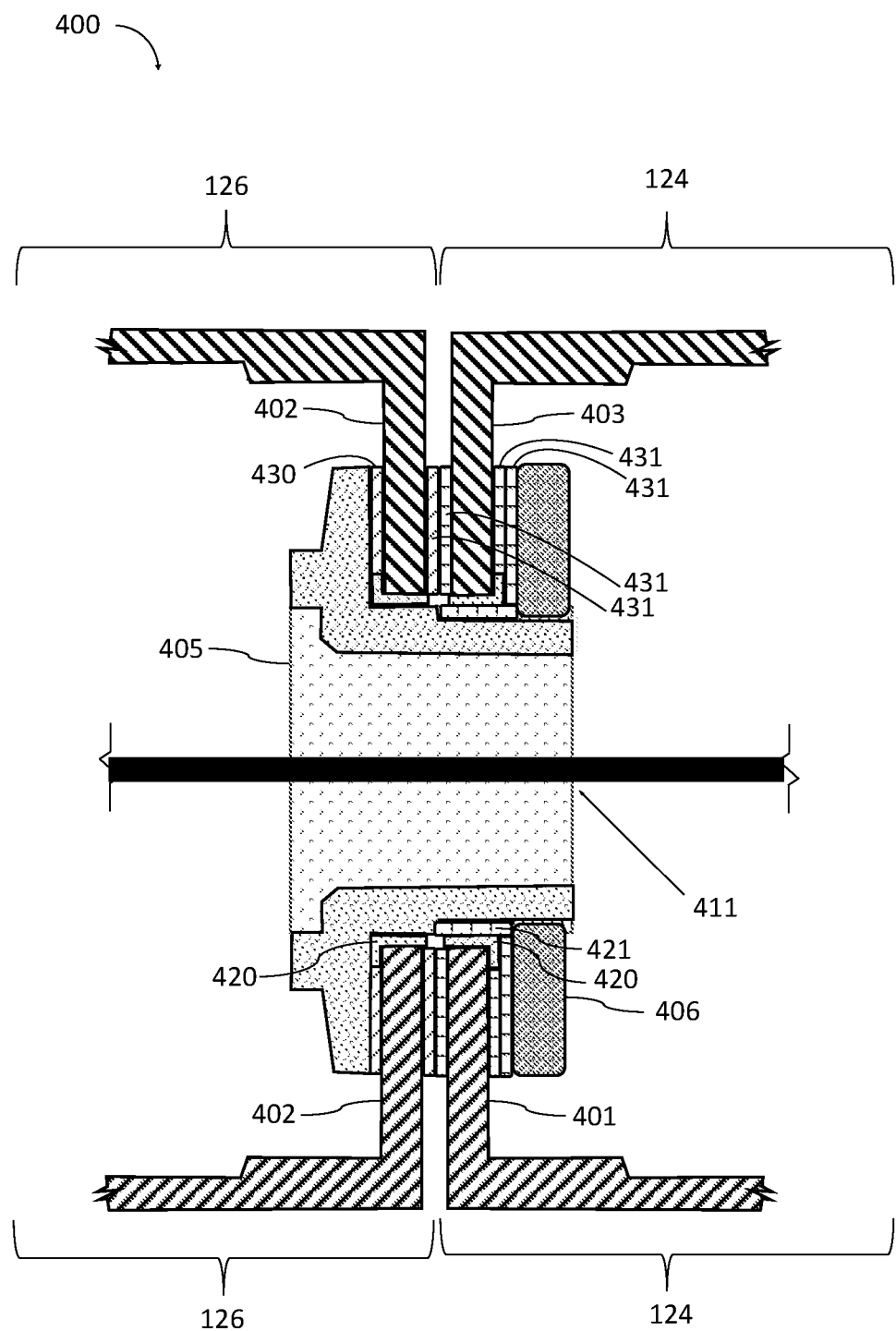
FIG. 8 represents a section view of a TE-Rib-Hinge, TE-Hollow-Pin (405), Rotator-Rib and Static Rib.

FIG. 8 represents section view of the TE-Rib-Hinge (401). In FIG. 8, the Power Cable (411) is an electrical cable, an assembly of one or more electrical conductors, usually held together with an overall sheath. The assembly is used for transmission of electrical power. The Power Cable represents a conduit from the right-wing to the articulating TrailingEdge-Leaf (124) through TE-Hollow-Pin (405)

In FIG. 7 and FIG. 8, a Bushing (420) inserts into hole in the Rotator-Rib or Static-Rib protecting the rib. The Rotator-Rib or Static-Rib provide for Carbon Fiber Reinforced Plastic (CFRP) as the rib material. A Wear Bushing (421) inserts outside the Hollow-Pin, and in this best mode, and provides for polytetrafluoroethylene PTFE as the Wear Bushing material. The Washer (430) thin plate, disk-shaped, with a hole represents a non-wearing washer. The Wear Washer (431) thin plate, disk-shaped, with a hole and provides for polytetrafluoroethylene PTFE as the Wear Washer material.

Tilt-Motor (173) in the best mode embodiment, provides for an electric motor.

Torque Rod (174) provides for a physical synchronization between two Tilt Motors. Bevel gears enable multiple torque rods to connect two Tilt Motors.

Figure 9:
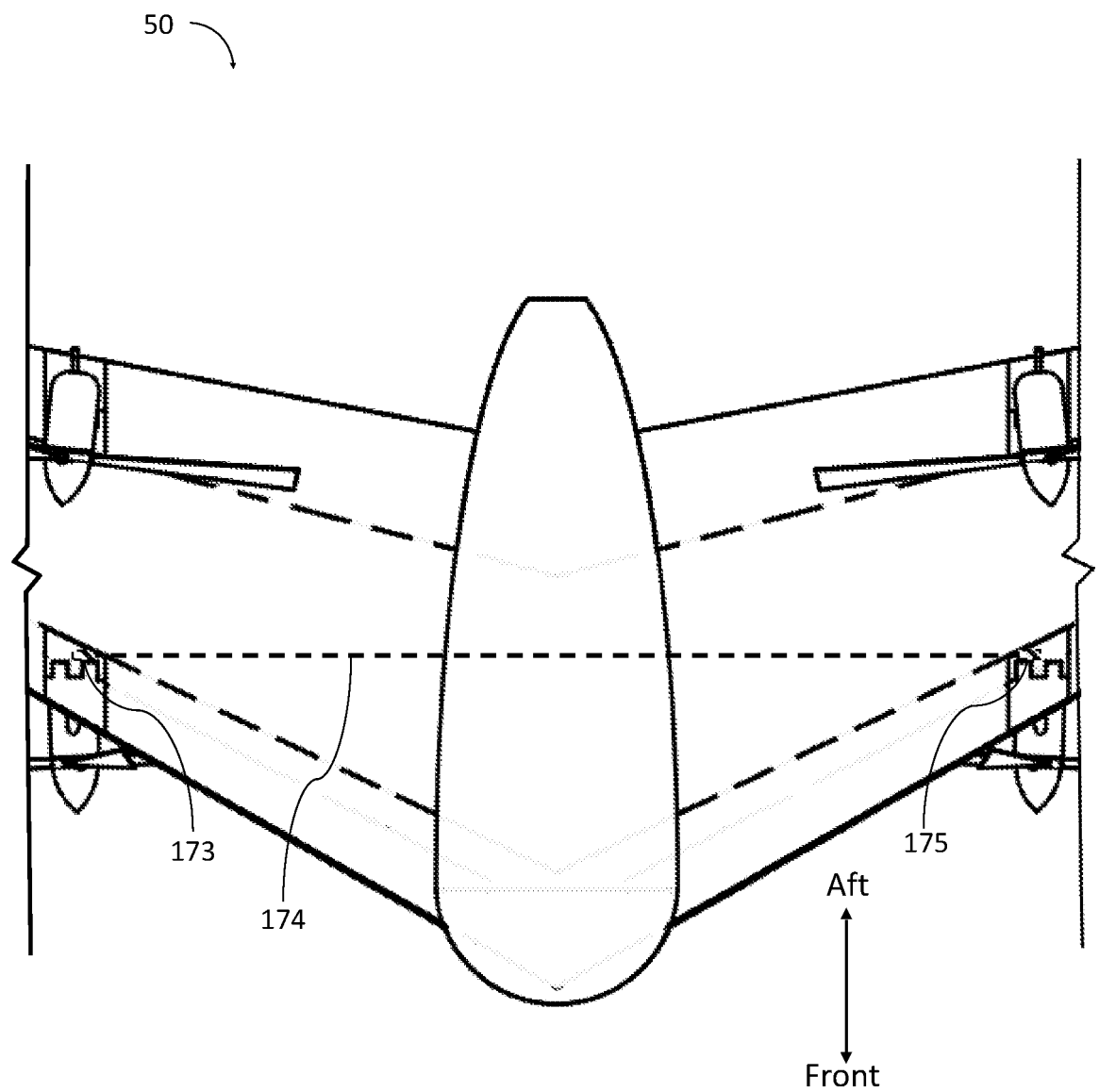
FIG. 9 represents a top view of the airplane and a Torque Rod.

FIG. 9. Tilt-Motor in the best mode embodiment, provides for an electric motor. FIG. 9 represents a top view of the airplane and a Torque Rod. A Tilt-Motor (173) in the best mode embodiment, provides for an electric motor. First Tilt-Motor (173) is represented in the right wing and a Second Tilt-Motor (175) is represented in the left wing. A Control Unit (160) represented in FIG. 6A, is the primary method for synchronizing a plurality of Tilt-Motors. A secondary method of tilt rotation synchronization is a Torque Rod (174) represented as the dashed line in FIG. 9 between the two Tilt-Motors (173). The Torque Rod (174) provides for a physical synchronization between two Tilt Motors. Bevel gears enable a plurality of torque rods to connect two Tilt Motors with an equivalent effect.

Physically linking Tilt-Motors provides another layer of fail safety. If the first Tilt-Motor (173) fails, the second Tilt-Motor will keep the first Tilt-Motor spinning and synchronized.

In another scenario, if the first Tilt-Motor (173) seizes, a physical connection between two Tilt-Motors will break away, allowing the second Tilt-Motor to continue. The physical connection was designed to break away with the full force of one Tilt-Motor. In the same scenario, the Tandem-TiltRotor link breaks by unscrewing a Electric-Screw-Actuator (166) from the Slotted-Joint (167) embedded into the FrontLink (117), represented in FIG. 6B. The Control Unit should then be able to re-synchronize 3 out of 4 rotors, enough for a near vertical landing.

Figure 10:
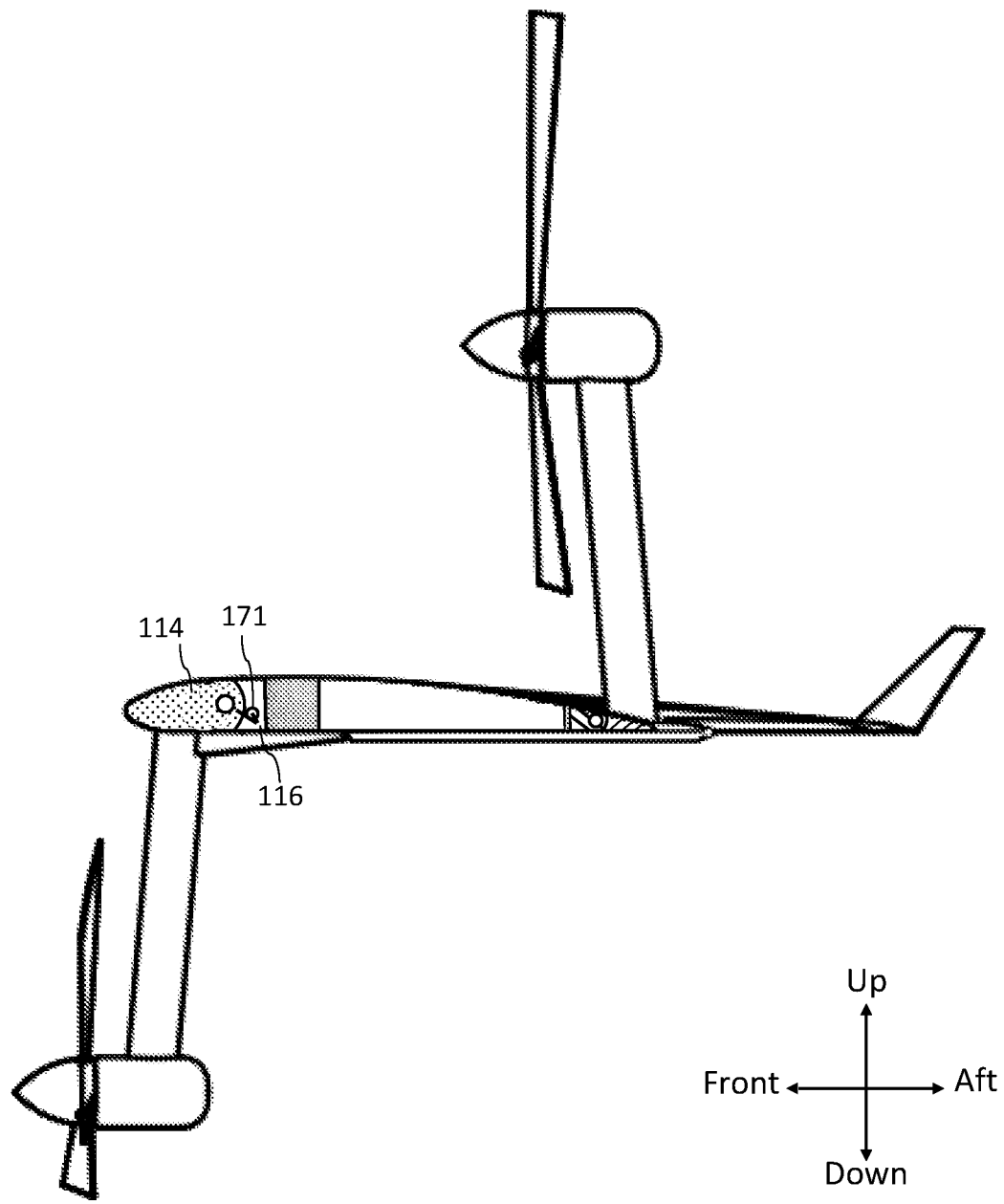
FIG. 10 represents a side view of a Tilt-Rotary-Sensor in the context of a right-wing section cut.

Looking to FIG. 10, a Tilt-Rotary-Sensor (171) is represented in the context of a right-wing section cut. FIG. 10 represents a first armature connecting to the LeadingEdge-Leaf (114). At the distal end of the first armature, the first armature is connected to a second armature. At the distal end of the second armature, from the first armature and second armature connection, the second armature provides for a connection to the Tilt-Rotary-Sensor (171). The Tilt-Rotary-Sensor body provides for a connection to the Front-Wingleaf (116). When the LeadingEdge-Leaf rotates, the Tilt-Rotary- Sensor will also rotate providing output representing the rotation of the LeadingEdge-Leaf to the Control Unit (160).

What is claimed is:

1. A tandem-tiltrotor apparatus, comprising:
   a right-wing (150);
   a front-wingleaf (116) connected and fixed with no degrees of freedom to the right-wing;
   a le-hollow-pin (404) extending substantially in an inboard-outboard direction of an aircraft and connected to the front-wingleaf;
   a leadingedge-leaf (114) connected to the le-hollow-pin providing the leadingedge-leaf having 1-degree of rotational freedom around the le-hollow-pin; wherein the leadingedge-leaf does not extend forward of a leading edge of the right wing;
   a front-pylon (113) connected to the leadingedge-leaf; and
   a thrust propulsion unit attached to the front-pylon.

2. The tandem-tiltrotor apparatus of claim 1; further comprising of:
   a trailingedge-wingleaf (126) connected to the right-wing;
   a te-hollow-pin (405) extending substantially in an inboard-outboard direction of the aircraft, connected to the trailingedge-wingleaf; and
   a trailingedge-leaf (124) connected to the te-hollow-pin providing the trailingedge-leaf having 1-degree of rotational freedom around the te-hollow-pin.

3. The tandem-tiltrotor apparatus of claim 1; further comprising of:
   a tilt-actuator (170) connected to front spar (153), and connected to the leadingedge-leaf (114).

4. The tandem-tiltrotor apparatus of claim 1; further comprising of:
   a tilt-rotary-sensor (171) body connected to the front-wingleaf and a rotatable, double armature of the tilt-rotary-sensor connected to the leadingedge-leaf (114).

5. The tandem-tiltrotor apparatus of claim 1; further comprising of:
   a tilt-rotary-sensor (171) body connected to the trailingedge-wingleaf (126) and a rotatable, double armature of the tilt-rotary-sensor connected to the trailingedge-leaf (124).

6. The tandem-tiltrotor apparatus of claim 1; further comprising of:
   a front-pylon (113) with a profile shape of a guide vane connected at an end of the front-pylon to a lower surface of the leadingedge-leaf.

7. The tandem-tiltrotor apparatus of claim 2; further comprising of:
   a tilt-actuator (170) connected to an aft spar (154), and connected to the trailingedge-leaf (124).

8. The tandem-tiltrotor apparatus of claim 2; further comprising of:
   an aft-pylon (123) with the profile shape of a guide vane connected at an end of the aft-pylon to the upper surface of the trailingedge-leaf.

9. A tandem-tiltrotor link apparatus, comprising:
   a right-wing (150);
   a front-wingleaf (116) connected and fixed with no degrees of freedom to the right-wing;
   a le-hollow-(404)) extending substantially in an inboard-outboard direction of the aircraft and connected to the front-wingleaf;
   a leadingedge-leaf (114) connected to the le-hollow-pin providing the leadingedge-leaf 1-degree of rotational freedom around the le-hollow-pin;
   a frontlink (117) fixed to the leadingedge-leaf lower surface;
   a trailingedge wingleaf (126) connected and fixed with no degrees of freedom to the right wing;
   a te hollow pin (105) extending substantially in an inboard outboard direction of the aircraft, and connected to the trailingedge wingleaf;
   a trailingedge leaf (121) connected to the te hollow pin providing the trailingedge leaf 1 degree of rotational freedom around the te hollow pin;
   a te spur (127) fixed to the trailingedge leaf,
   an aftlink hinge (132) fixed to the te spur; and
   a landing link (130) connected to a frontlink-hinge (131) and connected to the aftlink-hinge, wherein the landing link provides ground landing gear when the tandem tilt-rotor apparatus is in a vertical configuration.

10. A tandem-tiltrotor link apparatus comprising:
    a right-wing (150);
    a front-wingleaf (116) connected and fixed with no degrees of freedom to the right-wing;
    a le-hollow-pin (404)), residing within a leading edge of the right-wing and extending substantially in an inboard-outboard direction of the aircraft and connected to the front-wingleaf;
    a leadingedge-leaf (114) connected to the le-hollow-pin providing the leadingedge-leaf 1-degree of rotational freedom around the le-hollow-pin; and
    a frontlink (117) fixed to the leadingedge-leaf lower surface;
    a trailingedge wingleaf (126) connected and fixed with no degrees of freedom to the right wing;
    a te hollow pin (105) extending substantially in an inboard outboard direction of the aircraft, and connected to the trailingedge wingleaf;
    a trailingedge leaf (121) connected to the te hollow pin providing the trailingedge leaf 1 degree of rotational freedom around the te hollow pin;
    a te spur (127) fixed to the trailingedge leaf, and
    an aftlink hinge (132) fixed to the te spur;
    a pontoon-link (133) connected to the frontlink-hinge and connected to the aftlink-hinge; and
    a pontoon-link (133) connected to a frontlink-hinge (131) and connected to the aftlink-hinge, wherein the pontoon-link provides seaplane flotation when the tandem tilt-rotor apparatus is in a vertical configuration.

* * * * *